July 15, 1952      S. G. JOHNSON      2,603,506
DROP FRAME CONSTRUCTION
Filed Nov. 18, 1950      2 SHEETS—SHEET 2
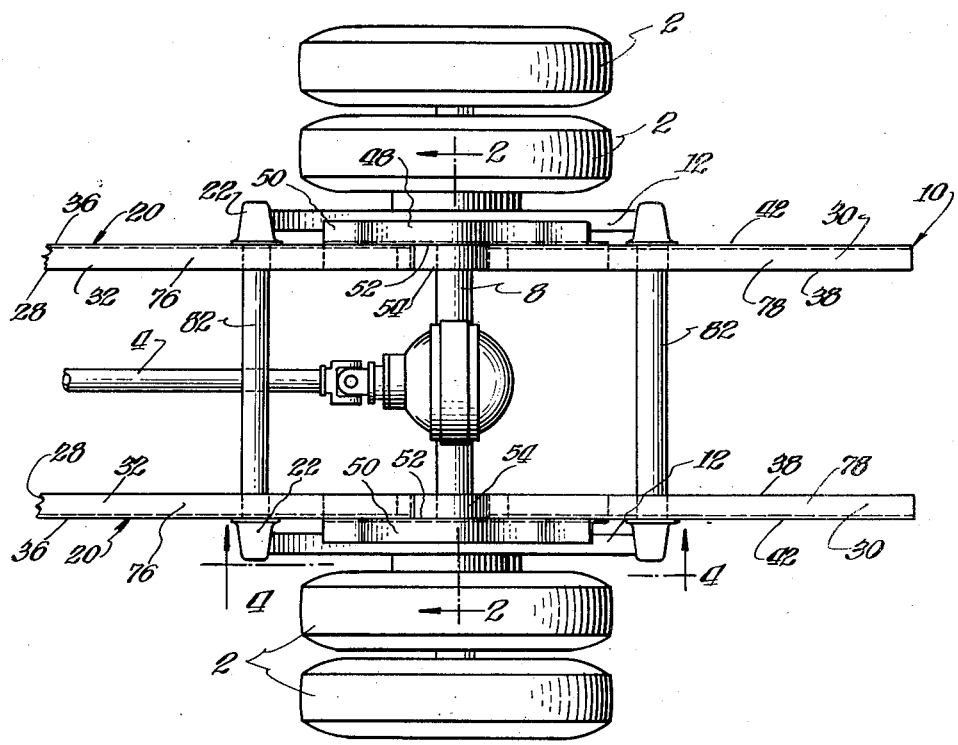
Inventor:
Samuel G. Johnson
By: Paul O. Pippel
Attorney.

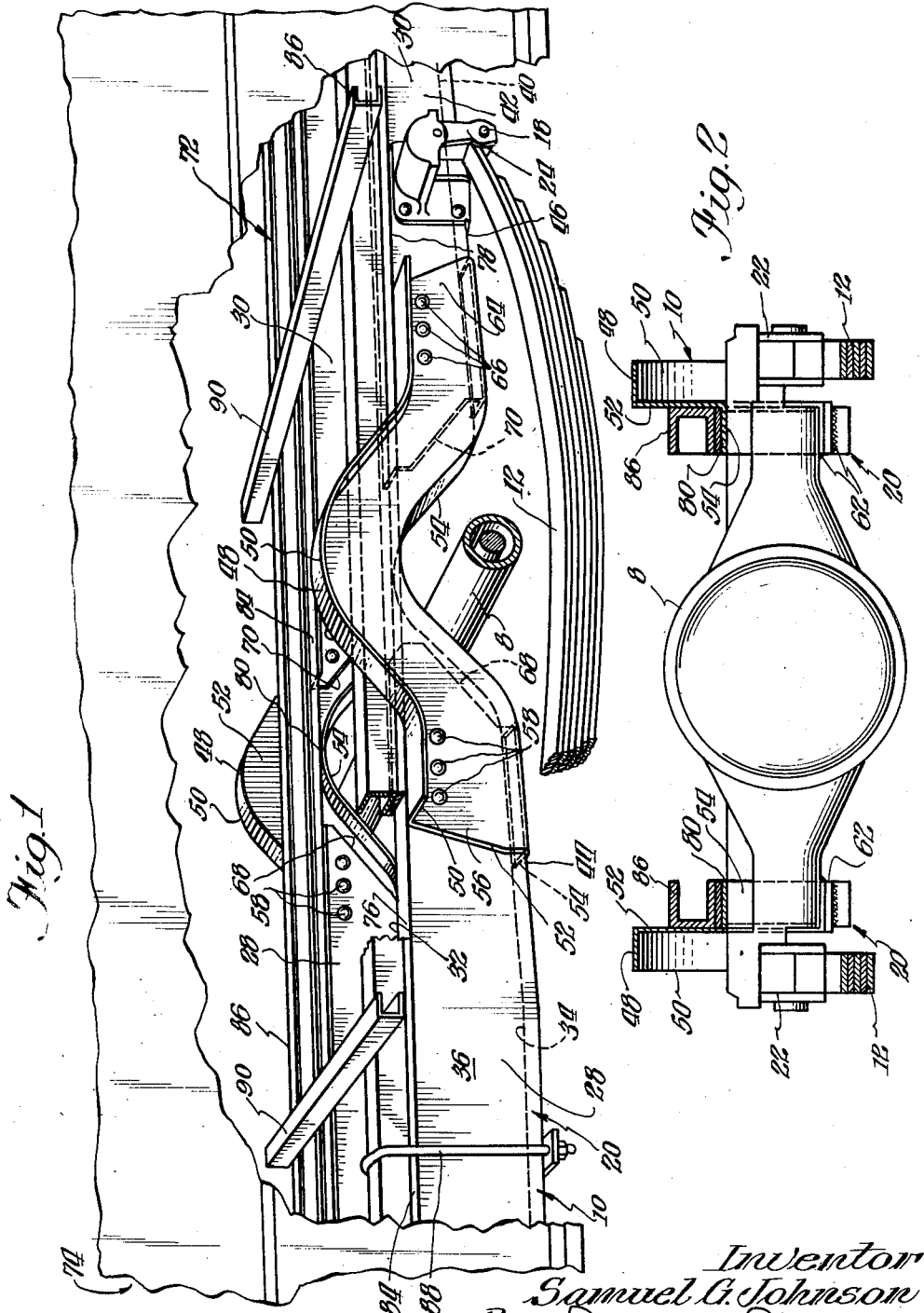

Patented July 15, 1952

2,603,506

UNITED STATES PATENT OFFICE 2,603,506

DROP FRAME CONSTRUCTION

Samuel G. Johnson, Fort Wayne, Ind., assignor to International Harvester Company, a corporation of New Jersey Application November 18, 1950, Serial No. 196,489

12 Claims. (Cl. 280—106)

This invention relates to motor trucks and more particularly to a heavy duty truck incorporating a low bed or frame of improved and novel construction that will support bodies, using standard sill construction, lower than heretofore possible.

In heavy duty vehicles, the side sills of the chassis frame are formed as channels of relatively great depth to provide sufficient strength for supporting the heavy weights imposed thereagainst. It is desirable however, to maintain the loading platform of the truck as low as possible to facilitate handling of the load and to obtain a low center of gravity for stability in transport. To meet these conditions, necessitates the provision of reasonable clearance between the top of the vehicle axle and the bottom of the vehicle side sills to allow for spring deflection. The tire radius plus the axle radius at the side sill plus the clearance mentioned above plus the depth of the side sill over the axle, normally regulate the minimum height from the vehicle side sills to the ground. Standard truck bodies are constructed using two longitudinal sills, each resting on each of the vehicle side sills, the longitudinal sills supporting a number of cross sills to which the body floor is attached.

Thus, it can be readily determined that bodies of standard construction when mounted, have a floor height from the ground that is the sum of the vertical dimensions of the above components. This invention describes a means of reducing the body height a maximum of the vehicle side sill depth over the axle.

A general object of the invention is to provide a vehicle frame that will permit a lower mounting of standard bodies, which is relatively simple and economical to manufacture.

A further object of the invention is to devise such a frame which affords the requisite strength and rigidity without encroaching upon the available space for the loading platform of the vehicle body.

The invention contemplates a truck chassis frame having side sills formed as fabricated members including sections disposed forwardly and rearwardly of the vehicle rear axle and joined over the axle by hump members of novel construction, which provide compact connections of great strength.

A more specific object of the invention is to form and assemble the fabricated hump members in such a manner as to permit unobstructed fore and aft clearance for the body longitudinal sills.

A different object of the invention is to arrange the sections of the side sills to provide a support on the entire top surfaces thereof for the framework of the vehicle body and for the hump members to provide areas over the axle for supporting the body framework coplanar with the top surfaces of the sections of the chassis side rail.

More specifically the hump members are formed of novel cross-section in the form of a sinusoidal curve, said members having portions tangential to the plane of the top support surface of the chassis frame and the areas of tangency being disposed directly over the rear axle of the vehicle and forming a support area for the framework of the associated vehicle body.

These and other objects of the invention will become more apparent from the specification and the drawings, wherein:

Fig. 1 is a fragmentary isometric view of a vehicle framework incorporating the invention.

Fig. 2 is a sectional view taken substantially on the line 2—2 of Figure 3.

Fig. 3 is a fragmentary top plan view, and Figure 4 is a sectional view taken substantially in the plane indicated by the line 4—4 of Figure 3. Parts may be omitted in certain views where better shown in others for purpose of clarity.

Describing the invention in detail, the motor truck illustrated is of heavy duty type and comprises rear driving wheels 2, 2 which are driven in conventional manner by a drive or torque shaft 4 connected through a differential and axles 6 to the wheels 2, 2. The axles and differential are enclosed within a conventional housing 8 which extends between the wheels 2, 2 at opposite sides of the truck.

A chassis frame generally indicated 10 is spring-supported from the housing 8 by means of leaf or semielliptic springs 12, 12 disposed at opposite sides of the truck, each spring being connected intermediate its ends to the housing 8 by a clamp 14 which is preferably a U-bolt. The opposite ends of each spring 12 are connected as at 16 and 18 (Fig. 4) to an adjacent side sill 20 of the frame 10. The connection at 16 may comprise a bracket 22 and a conventional pin joint between the spring 12 and bracket 22, the bracket suitably connected as by welding or rivets to the outboard side of the related side rail 20. The opposite end of each spring at 18 may be connected by a swing link 24 to a bracket 26 which may have pivotal connection with the link and fastened preferably as by rivets to the outboard side of the related side member 20.

Each side member or rail 20 is formed in two sections 28 and 30, the section 28 being disposed forwardly of the housing 8 and section 30 rearwardly thereof. The related sections 28 and 30 of each side sill 20 are alined longitudinally of the vehicle and each is a U-section channel member. Each member 28 comprises generally horizontal inwardly extending webs or flanges 32 and 34 and an intervening substantially vertical outboard wall 36 inter-connecting the flanges 32 and 34. Each section 30 also comprises top and bottom generally horizontal inturned flanges 38 and 40 and an interconnecting substantially outboard wall 42. As best seen in Fig. 4 the bottom edge of the rear end of each member 28 is tapered upwardly rearwardly as at 44 and the bottom edge at the forward end of each section 30 is flared downwardly toward the forward end of the member 30 as at 46. This construction provides the desired depth of the sections 28 and 30 at their connection by the related hump member 48.

Each hump member 48 is in the form of a sinusoidal curve in side elevation and is of Z-section and comprises an outboardly extending top flange or web 50 merging at its inboard edge with the top edge of a vertical wall 52 which at its lower edge merges with the outboard edge of an inturned bottom flange 54. The forward end portion 56 of each member is aligned with the end of the related member 28 transversely thereof and has the inboard side of the web 52 thereof bearing against the outboard side of the web 36 and joined thereto in any convenient manner preferably as by a plurality of rivets 58. The flange 54 is disposed beneath the flange 34 and in complementary engagement on the top side thereof with the bottom side of flange 34. The flange 54 may be connected as by welding or riveting at 62 along its longitudinal and transverse edges to the flange 34.

The rear extension 64 of each hump member may be similarly connected to the rear section 30 of the related side sill 20. The rear end of flange 54 may be disposed beneath the flange 40 of member 30 and weld-connected or riveted thereto along its longitudinal and transverse edges. The wall 52 may engage against the outboard side of wall 42 and may be connected thereto as by a plurality of rivets 66, 66.

The adjacent ends of the related sections 28 and 30 may be sheared diagonally as at 68 and 70 respectively and receive the intermediate upwardly convexed portion of the flange 54 therebetween. It will be seen that the members 48, 48 are disposed against the outboard or outward sides of the side sills 20, 20 and that they do not encroach on the available space for the body framework generally indicated 72 of a truck body 74, Fig. 1. Each side rail provides coplanar seating or support surfaces 76 and 78 on the top sides of the flanges 32 and 38 of the members 28 and 30 thereof, said seating area extending the full length of said members. The flange 54 of each member 48 provides at the crest of its curvature a seating area 80 coplanar with the surfaces 76 and 78. The area 80 is preferably tangential to the plane of the surfaces 76 and 78 and is located directly above or in vertical alignment with the housing 8. The side members 20, 20 of the frame 10 may be interconnected at longitudinally spaced points by cross braces or beams 82, 82 and as shown in Fig. 3 these braces may be disposed fore and aft of the axle area of the vehicle chassis frame. It will be understood that any suitable number of cross braces 82 may be employed.

A non-metallic liner such as a strip of wood 84 extends the full length of surfaces 76 and 78 and seats thereon and on the surface 80. On each liner 84 is positioned a continuous side rail or beam 86 of the truck body framework 72. As shown in the drawings, each side member 86 is preferably a U-shaped channel member which is bolted at a plurality of points to the associated side sill of the chassis frame as by U-bolts 88. The side rails 86, 86 of the framework of the body may be interconnected in any convenient manner such as by welding by a plurality of cross beams 90, 90. The cross braces are superposed on the rails 86 and carry the truck platform thereon as is conventional practice and readily understood by those skilled in the art.

Thus it will be seen that the body framework is supported along the entire extent of the side sills of the chassis frame and that a novel support directly over the axle is provided by the hump members 48, 48 which also serve as positioning means therebetween for the body framework 72. The members 48 being of Z-section and of the shape described form a rigid and strong connection between the sections of the side sill and join with extensive areas of the sections adjacent to the top and bottom edges thereof.

I claim:

1. In a chassis frame for a motor vehicle, longitudinal side frame elements, each element comprising longitudinally aligned sections U-shaped in cross section, each section comprising inwardly extending top and bottom flanges and a substantially vertically outboard wall interconnecting said flanges, a hump member Z-shaped in cross section interconnecting said sections and comprising a substantially vertical wall connected to the outboard sides of the walls of said sections and having an inturned bottom flange extending at one end beneath the bottom flange of one section and connected thereto and at the other end beneath the bottom flange of the other section and connected thereto, said bottom flange being convexed upwardly and presenting an area on the top side thereof coplanar with the top sides of the top flanges of said sections to provide a support surface for an associated vehicle body, said area being disposed inwardly of said wall of the member and being substantially coextensive transversely of said sections with the top sides of said top flanges and in alignment therewith longitudinally of the vehicle.

2. In a chassis frame for motor vehicles, a longitudinal side element at each side of the frame, said element comprising spaced sections, an upwardly curved hump member interconnecting adjacent ends of said sections over the vehicle axle, said member being Z-shaped in cross section and comprising a bottom inwardly extending flange, said flange being curved between adjacent ends of said sections and providing a seating area at the highest segment thereof substantially coplanar with the top sides of said sections to provide therewith a support surface for an associated vehicle body in a common plane.

3. In a vehicle chassis frame, a pair of interconnected side sills, each sill comprising longitudinally aligned beam sections, a hump member interconnecting adjacent ends of said sections, said hump member being disposed against the outward sides of said sections and comprising a flange extending at its ends beneath said sections and connected to the bottom sides thereof, said flange having an upwardly curved intermediate segment extending between said sections, the uppermost area of said intermediate segment being disposed at a level no higher than the top sides of said section.

4. In a vehicle chassis frame, a pair of longitudinal side members, each side member comprising forward and rear sections aligned longitudinally of the vehicle, adjacent ends of said side sections being interconnected by a hump member curved upwardly, said hump member having an inturned bottom flange extending at its ends beneath the ends of the respective sections and connected thereto, said hump member having a substantially vertical wall merging at its bottom edge with the outboard edge of said bottom flange and buttressed at its inboard side against the outboard sides of said sections and connected thereto, an outturned flange merging at its inboard edge with the top edge of said wall, said bottom flange extending between adjacent ends of said sections, said sections being sheared diagonally at adjacent ends whereby permitting the curvature of said bottom flange to be substantially flattened.

5. In a motor truck, a vehicle chassis frame comprising spaced side members, each side member having a hump portion, a vehicle axle housing beneath said hump portions and movable into said hump portions, spring means resiliently supporting said chassis frame said housing, said side members providing seating areas on their top edges interrupted over the axle, said hump portions providing a seating surface in the plane of said seating areas directly over the axle housing, each portion being offset outboardly of the plane of the related side member and having the seating surface thereof in the plane of the side member, a body framework having longitudinal continuous side beams superposed directly above each side member and seated on the seating area thereof and on the surface of said portion thereof, and means connecting said framework with said chassis frame.

6. In a motor truck, spaced driving wheels, a housing therebetween enclosing driving means therefor, a chassis frame having spaced side sills disposed between said wheels and spring-supported from said housing, each sill comprising an upwardly curved section over the housing, the section having an inwardly extending flange at the bottom thereof in the plane of the related sill and having the remainder thereof offset outboardly of the plane of the sill and having a substantially vertical portion extending above the top side of the sill, the top side of each sill and said flange presenting substantially coplanar seating areas, and a load-carrying framework seated on said areas in close confinement between said vertical portions of said sections.

7. In a vehicle chassis frame, spaced side sills, each sill comprising fore and aft sections, an over the axle connection between said sections and comprising a hump member having an intermediate portion in the form of a sinusoidal curve convexed upwardly, and having end portions in alignment with said sections transversely of the frame, one end portion being connected to the outboard and bottom side of the adjacent end of one of the sections and the other end portion being connected to the outboard and bottom sides of the adjacent end of the other portion, said hump member being Z-shaped in cross section and having substantially parallel top and bottom flanges and a substantially vertical web between and interconnecting said flanges, said bottom flange at said intermediate portion of said member extending between said sections.

8. In a vehicle chassis frame, spaced side members each side member comprising a plurality of sections, one of said sections tapering toward the other and the other section flaring toward the other, an upwardly curved hump member Z-shaped in cross section having a bottom flange connected to the bottom sides of said sections, a substantially vertical wall extending upwardly from the outboard edge of said bottom flange and connected to the outboard sides of said sections, an outturned flange extending outboardly from the upper edge of said wall, a spring adjacent each side member and extending longitudinally of the vehicle, each spring having its ends connected to the sections of the related side sill at areas outwardly of the hump member, and an unsprung mass extending beneath said hump members over the springs and connected thereto and movable into the plane of the chassis frame within said hump members.

9. In a motor vehicle, a chassis frame, said chassis frame having spaced side members having seating areas on the top sides thereof extending the full length of the frame and discontinued only in the area over the vehicle axle, each side member having an outwardly offset section over the axle and extending above said area and having upwardly curved portions at the bottom thereof providing a seating area at its crest tangential to the said seating area of the side members, and a vehicle frame comprising a side rail at each side thereof continuous and substantially straight and extending from one end of the frame to the other end of the frame and seated on all of said areas of the side members and portions therebelow.

10. The combination with an upsprung mass including a transverse axle assembly, of a side sill for a vehicle chassis frame comprising spaced sections in longitudinal alignment, an upwardly offset hump member extending over the axle assembly and interconnecting adjacent ends of said sections, said hump member having an upwardly convexed portion extending between adjacent ends of said sections and providing at the crest of its curvature a bearing surface generally tangential to the plane of the top sides of said sections and affording a seat therewith for an associated supported structure, said hump member having its remaining portion offset laterally with respect to said sections and connected to the sides thereof and providing an upstanding inwardly facing body-confining surface above the level of said sections disposed outboardly of said bearing surface, and a leaf spring operatively connected between said axle assembly and the side sill and disposed beneath and generally paralleling said remaining portion of the hump member.

11. A side sill for a motor vehicle chassis frame comprising spaced sections, a hump member against the outboard sides of said sections and connected thereto, said hump member being Z-shaped in cross section and having an outboardly extending flange at its upper edge and having an inwardly extending flange at its lower edge and having a substantially vertical web intermediate said flanges and merging therewith, said hump member being in the form of an upwardly convexed sinusoidal curve, said inward flange having its intermediate portion curved between adjacent ends of said section, said flanges serving to strengthen said vertical wall against lateral deflection, and said bottom flange and said sections having seating surfaces for an associated supported structure.

12. A sill member for a motor vehicle chassis frame comprising spaced sections, a connecting element interconnecting said sections, each section comprising top and bottom inwardly extending flanges and an outboard substantially vertical wall between the flanges and merging therewith, said element comprising a substantially vertical web connected at opposite ends to the outboard sides of the outboard walls of said sections, a bottom flange on said element extending inwardly from the lower edge of said web and having one end beneath the bottom flange of one of said sections and connected therewith and having its other end beneath the bottom flange of the other of said sections and connected therewith, said flange of said element being curved upwardly intermediate its ends with the bottom edge of said web and extending between adjacent ends of said sections to a point no higher than the top sides of said sections, said web extending above the top sides of said sections, and an outboardly extending flange on the upper edge of said web.

SAMUEL G. JOHNSON.

REFERENCES CITED

The following references are of record in the file of this patent:

UNITED STATES PATENTS

| Number | Name | Date |
| --- | --- | --- |
| 1,690,351 | Whitten | Nov. 6, 1928 |
| 2,337,281 | Sherman | Dec. 21, 1943 |